June 3, 1930.    R. F. KOHR    1,760,908
BRAKE OPERATING MEANS
Filed Sept. 26, 1929

INVENTOR.
Robert F. Kohr
BY
ATTORNEY

Patented June 3, 1930

1,760,908

UNITED STATES PATENT OFFICE

ROBERT F. KOHR, OF SOUTH BEND, INDIANA, ASSIGNOR TO THE STUDEBAKER CORPORATION, OF SOUTH BEND, INDIANA, A CORPORATION OF NEW JERSEY

BRAKE-OPERATING MEANS

Application filed September 26, 1929. Serial No. 395,323.

This invention relates to brake applying means for motor vehicles and particularly to the brake cross shaft, the principal object being the provision of a pivotally mounted cross shaft having connected adjacent to its ends the brake applying rods adapted to operate the brakes on the respective front and rear wheels.

Another object is to provide in combination with the braking mechanism of a motor vehicle, a cross shaft offset intermediate its ends having operating means effective on the offset portion mounted to pivot on the longitudinal axis of the ends of the shaft.

Another object is to provide in combination with a braking mechanism of a motor vehicle, a cross shaft having an offset therein intermediate its ends supported by arms pivotally supported by brackets on substantially the longitudinal axis of the end portions of the shaft, and operating arms engaging the offset portion of the cross shaft operatively connected with manually controlled brake applying means for rocking said cross shaft to apply the brakes.

These being among the objects of the present invention the same consists of certain features of construction and combination of parts to be hereinafter described with reference to the accompanying drawing, and then claimed, having the above and other objects in view.

In the accompanying drawing which illustrates a suitable embodiment of the present invention, Figure 1 is a fragmentary plan view showing a portion of a vehicle frame having the brake cross shaft mounted thereon.

Figure 1:
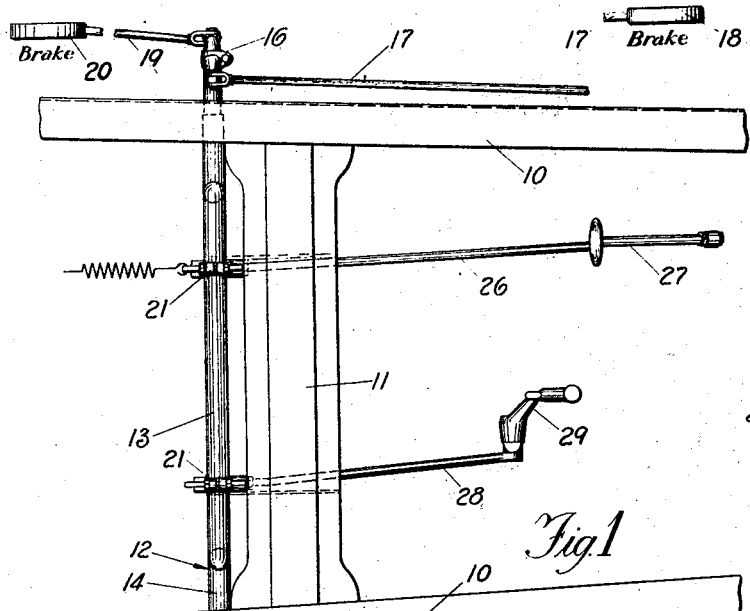
Figure 4:
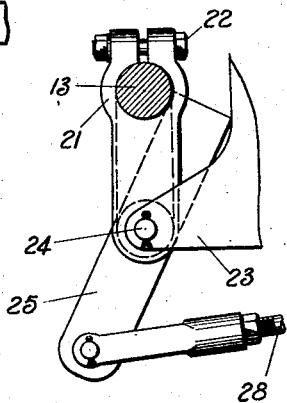
Figure 4 is a sectional view taken on the line 4—4 of Figure 3.
Figure 2:
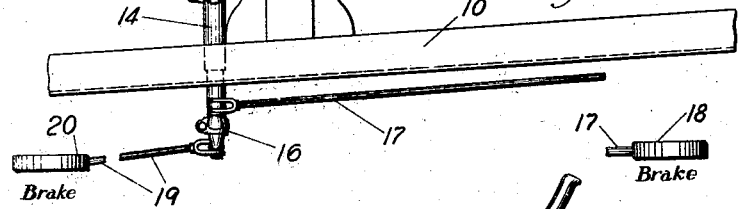
Figure 2 is a fragmentary side elevation of the brake applying mechanism shown in Figure 1.
Figure 5:
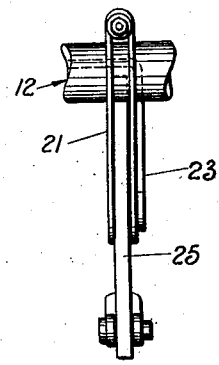
Figure 5 is an enlarged elevational view of a fragment of the cross shaft and one of the cross shaft operating levers.
Figure 3:
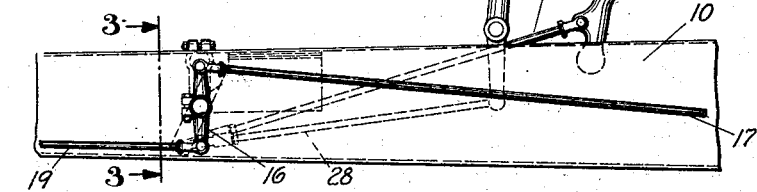
Figure 3 is a transverse sectional view taken substantially on the line 3—3 of Figure 2.
Figure 3:
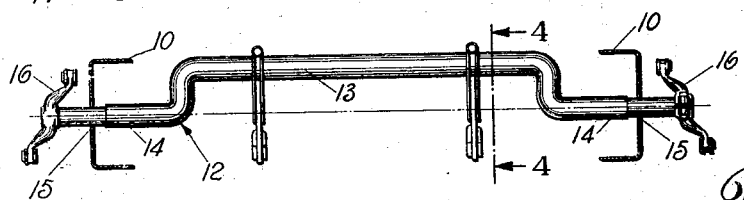

Referring to the accompanying drawing in which like numerals refer to like parts throughout the several views, I have shown a vehicle frame comprising side rails 10 and a cross connecting member 11 suitably secured thereto. A brake cross shaft 12 having an offset portion 13 and end portions 14 extend transversely of the side rails 10 adjacent to the cross member 11, the ends 14 of the shaft preferably extending through openings 15 formed in the side rails 10. Double armed levers 16 are secured in any suitable manner on the end portions 14 of the cross shaft 12 and have pivotally secured thereto brake rods 17 suitably connected with front wheel brakes 18. The opposite arm of each of the levers 16 is pivotally connected with the rods 19 operatively connected with the rear wheel brakes 20. It will thus be seen that rotation of the cross shaft 12 will move the double armed levers 16 thereon whereby the brakes 18 and 20 on that side of the vehicle will be operated.

A pair of U-shaped arms 21 are secured against rotation on the offset portion 13 of the cross shaft by means of the clamping bolts 22. Brackets 23 secured to the cross member 11 support pivot pins 24 on which the arms 21 are pivotally mounted. The pins 24 are preferably mounted on substantially the longitudinal axis of the end portions 14 of the cross shaft so that the shaft is oscillated on the same center as the end portions thereof and the end portions 14 are not swung on an arc of a circle when applying the brakes.

Operating arms 25 are pivoted intermediate their ends on the pins 24, one of the arms 25 being pivotally connected at one end thereof with a rod 26 which is pivotally connected at its other end with the foot brake pedal 27. The other of the operating arms 25 is pivotally connected at one end thereof with a rod 28 which is pivotally connected at its opposite end with the hand service brake lever 29. The operating arms 25 each have an upwardly extending portion positioned between the arms of the U-shaped members 21 adapted to engage with the offset portion 13 of the cross shaft. It will thus be seen that when either the foot brake pedal 27 or the hand lever 28 is operating that the operating arm 25 connected with the respective brake applying member will cause the rock shaft 12 to pivot on the pins 24 to cause rotation of the same whereby the double armed bracket 16 will be effective to apply the brakes on the front and rear wheels.

The brake applying means shown can be cheaply constructed, is efficient in operation and no lubrication is necessary for the respective moving parts thereof. Also the accumulation of rust and dirt on the brake operating parts will not affect the efficiency or operation of the same and the brakes can be applied as easily when the operating parts have become loaded with dirt as when the same leaves the factory. Furthermore, if for any reason, the cross shaft 12 should be broken or the brake operating arms on either side of the vehicle should be broken or disconnected, the brake applying means will be effective for applying the brakes on at least two of the wheels. This is a decided advantage because the driver will not be without brakes even though he should meet with rather a serious accident and the brake applying means should become partially defective.

Although I have shown and described a preferred embodiment of the invention, it is to be understood that formal changes may be made in the structure shown without departing from the spirit and substance of the broad invention the scope of which is commensurate with the appended claims.

What I claim is:

1. In a motor vehicle having brakes and a frame, a brake cross shaft, supporting means for said shaft pivotally supported on said frame, and means pivotally supported by said frame operable to rock said shaft to apply the vehicle brakes.

2. In a motor vehicle having brakes and a frame, a brake cross shaft having an offset therein, means carried by said frame for supporting said shaft, and means engageable with the offset portion of said shaft pivoted on substantially the longitudinal axis of the ends of said shaft operable to rock said shaft to apply the vehicle brakes.

3. In a motor vehicle having brakes and a frame, a brake cross shaft having an offset therein, arms carried by said frame rigidly secured to the offset portion of said shaft for supporting the same, and means engageable with the offset portion of said shaft operable to rock the same to apply the vehicle brakes.

4. In a motor vehicle, a brake cross shaft having an offset therein intermediate its ends, supporting arms secured to the offset portion of said shaft pivotally mounted on the vehicle frame at substantially the longitudinal axis of the ends of said shaft, and operating means for said shaft pivoted on the vehicle frame engaging the offset portion of the shaft to rock the same to apply the vehicle brakes.

5. In a motor vehicle having brakes and a frame, a brake cross shaft having an offset therein intermediate its ends, arms secured to the offset portion of said shaft pivotally mounted on the vehicle frame at substantially the longitudinal axis of the ends of said shaft, an arm pivoted on said frame operatively connected with driver operated brake operating means and engageable with the offset portion of said shaft whereby operation of the brake operating means will cause said arm to rock said shaft to apply the vehicle brakes.

6. A vehicle having brakes, and comprising in combination therewith, a driver operated rock shaft having an offset therein intermediate its ends extending transversely of the vehicle, connections with each end of the shaft to the vehicle brakes, spaced means for supporting the rock shaft secured to the offset portion thereof, and means engaging the offset portion of the shaft to rock the same to apply the vehicle brakes.

7. A vehicle having brakes, and comprising, in combination therewith, a driver operated rock shaft extending transversely of the vehicle having an offset therein intermediate its ends, connections with each end of the shaft to the vehicle brakes, spaced arms secured to the offset portion of said shaft pivotally mounted on the vehicle frame on substantially the longitudinal axis of the ends of said shaft, and operating means for said shaft pivoted on the vehicle frame engaging the offset portion of the shaft to operate said brakes.

8. A vehicle having brakes and a frame, and comprising in combination therewith, a driver operated rock shaft extending transversely of the vehicle having an offset therein intermediate its ends, supporting members for said rock shaft secured to the offset portion thereof, brackets secured to said frame, pivot pins carried by said brackets for pivotally supporting said supporting members, the longitudinal axis of said pivot pins being on substantially the longitudinal axis of the ends of said cross shaft, and means mounted on said pivot pins engaging the offset portion of said rock shaft for rocking said shaft to apply said brakes.

Signed by me at South Bend, Indiana, this 23rd day of September, 1929.

ROBERT F. KOHR.